(12) United States Patent
Shah et al.

(10) Patent No.: US 12,020,296 B2
(45) Date of Patent: Jun. 25, 2024

(54) SYSTEMS AND METHODS FOR PROVIDING CONTEXTUALIZED REVIEWS

(71) Applicant: Capital One Services, LLC, McLean, VA (US)

(72) Inventors: Salik Shah, Washington, DC (US); Michael Mossoba, Arlington, VA (US); Cruz Vargas, Alexandria, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 40 days.

(21) Appl. No.: 16/868,871

(22) Filed: May 7, 2020

(65) Prior Publication Data

US 2021/0350423 A1 Nov. 11, 2021

(51) Int. Cl.
| | |
|---|---|
| *G06Q 30/0282* | (2023.01) |
| *G06F 3/01* | (2006.01) |
| *G06F 17/15* | (2006.01) |
| *G06F 40/20* | (2020.01) |
| *G06Q 30/0601* | (2023.01) |

(52) U.S. Cl.
CPC ......... *G06Q 30/0282* (2013.01); *G06F 3/011* (2013.01); *G06F 17/15* (2013.01); *G06F 40/20* (2020.01); *G06Q 30/0641* (2013.01)

(58) Field of Classification Search
CPC . G06Q 30/02; G06Q 30/0282; G06Q 30/0641
See application file for complete search history.

(56) References Cited

U.S. PATENT DOCUMENTS

| | | | |
|---|---|---|---|
| 5,676,138 A | 10/1997 | Zawilinski | |
| 6,021,346 A | 2/2000 | Ryu et al. | |
| (Continued) | | | |

FOREIGN PATENT DOCUMENTS

| | | | | |
|---|---|---|---|---|
| CA | 2781784 A1 | * | 9/2012 | ............. G06Q 30/02 |
| CN | 101512574 A | * | 8/2009 | ............. G06Q 30/02 |
| CN | 103917968 A | * | 7/2014 | ............. G06Q 50/01 |

OTHER PUBLICATIONS

Ghabayen, Ayman S. and Ahmed, Basem H. "Polarity Analysis of Customer Reviews Based on Part-of-Speech Subcategory" Journal of Intelligent Systems, vol. 29, No. 1, 2020, pp. 1535-1544. https://doi.org/10.1515/jisys-2018-0356, (Year: 2020).*

*Primary Examiner* — Ilana L Spar
*Assistant Examiner* — Melinda Gieringer
(74) *Attorney, Agent, or Firm* — TROUTMAN PEPPER HAMILTON SANDERS LLP; Christopher J. Forstner

(57) ABSTRACT

Disclosed herein are systems and methods for providing contextualized reviews. A customer can make a review, such as reviewing a product or a business, outlining their experience. To provide additional emotional context, biometric data can be obtained and compared to the customer's historical biometric data. Upon determining that the biometric data has deviated from the historical biometric data, the review data from the review can be revised to include a notification. The customer can also be alerted and warned to not post the review if their emotional state is found to be negative. The process can be repeated on a plurality of customers opted-in to the contextualized review system. For the plurality of customers, a plurality of reviews can be analyzed for a business or service provider by, for instance, emphasizing emotional reviews, ranking the reviews, or filtering out non-emotional reviews.

20 Claims, 8 Drawing Sheets

(56) References Cited

U.S. PATENT DOCUMENTS

| | | | |
|---|---|---|---|
| 7,519,562 B1* | 4/2009 | Vander Mey | G06Q 30/02 705/12 |
| 9,282,087 B1* | 3/2016 | Fredinburg | H04L 63/0861 |
| 9,336,268 B1* | 5/2016 | Moudy | G06N 3/0445 |
| 9,571,879 B2 | 2/2017 | Dang et al. | |
| 9,940,395 B2 | 4/2018 | Allen et al. | |
| 10,105,608 B1 | 10/2018 | George et al. | |
| 10,169,830 B2* | 1/2019 | Smith | H04L 51/52 |
| 11,080,723 B2* | 8/2021 | Rashid | G06Q 30/0201 |
| 11,240,189 B2* | 2/2022 | DeLuca | H04L 67/535 |
| 2004/0210159 A1 | 10/2004 | Kibar | |
| 2007/0203426 A1 | 8/2007 | Kover et al. | |
| 2013/0066681 A1 | 3/2013 | Babila et al. | |
| 2015/0142888 A1* | 5/2015 | Browning | H04L 67/22 709/204 |
| 2015/0262264 A1* | 9/2015 | Appel | G06Q 50/01 705/347 |
| 2015/0356093 A1* | 12/2015 | Abbas | G06F 16/9535 707/748 |
| 2016/0110778 A1 | 4/2016 | Bostick et al. | |
| 2016/0189173 A1* | 6/2016 | King | G06Q 30/0201 705/7.29 |
| 2016/0335701 A1* | 11/2016 | Allen | G06Q 30/0631 |
| 2017/0076338 A1* | 3/2017 | Kerr | G06F 16/9537 |
| 2017/0109838 A1* | 4/2017 | Byron | G06Q 50/01 |
| 2017/0139919 A1* | 5/2017 | Ball | G06F 16/248 |
| 2017/0140051 A1* | 5/2017 | Ball | H04L 51/32 |
| 2018/0011881 A1 | 1/2018 | Chan et al. | |
| 2018/0157995 A1 | 6/2018 | O'Malley | |
| 2018/0217981 A1* | 8/2018 | Rakshit | G06F 40/30 |
| 2019/0340250 A1* | 11/2019 | Rakshit | G06F 40/295 |
| 2019/0385199 A1* | 12/2019 | Bender | G16H 20/30 |
| 2019/0392493 A1* | 12/2019 | Miller | G06F 16/953 |
| 2020/0020000 A1* | 1/2020 | Guy | G06F 40/56 |
| 2020/0250716 A1* | 8/2020 | Laura | G06Q 30/0282 |
| 2021/0209513 A1* | 7/2021 | Torres | G06N 20/00 |

* cited by examiner

SYSTEMS AND METHODS FOR PROVIDING CONTEXTUALIZED REVIEWS

FIELD OF THE DISCLOSURE

Examples of the present disclosure relate generally to providing contextualized reviews. Particularly, examples of the present disclosure relate to systems and methods for providing context to reviews using biometric data.

BACKGROUND

Feedback reviews play a large role in how consumers perceive products and services. Negative reviews and feedback, therefore, have an adverse effect on business and products. Unfortunately, reviews tend to be polarizing, leaning towards being overly positive or overly negative. Consumers tend to share feedback in the heat of the moment and may only feel inclined to share feedback after a notable experience (good or bad).

It would be useful to add nuance to such reviews with the addition of some context surrounding the circumstances under which reviews were written. Providing context can therefore ensure feedback review systems are far more balanced and reliable than current systems. Additionally, adding nuance and context to feedback can better assist businesses and producers to improve their products and services. Providing additional review data to businesses can provide more constructive feedback, enable faster response times, and enable businesses to better tailor their goods and services to consumers.

What is needed, therefore, are systems and methods that can provide context to reviews to provide businesses with better consumer feedback. This, in turn, can enables businesses to provide improved products and services. Examples of the present disclosure address this need as well as other needs that will become apparent upon reading the description below in conjunction with the drawings.

BRIEF SUMMARY

Examples of the present disclosure relate generally to providing contextualized reviews; and, more particularly, to systems and methods for adding context to reviews using biometric data.

Examples of the present disclosure can include systems and methods for providing contextualized customer reviews. The method can receive review data from a review made by a customer, determine that the customer is part of an opt-in user database, receive biometric data from the customer, compare the biometric data with historical biometric data, and determine that the biometric data is deviating from the historical biometric data. Upon determining that the biometric data is deviating, the method can further append the review data to include an indication that the review was made with biometric data deviating from the historical biometric data and transmitting an alert to the customer comprising an indication of the same.

The opt-in user database can be associated with a plurality of users registered to participate in the contextualized review system. The plurality of users can also have biometric measurement devices, such as wearable smart devices. The biometric measurement devices can measure biometric data over time to obtain the historical biometric data. The historical biometric data can be indicative of baseline, or normal, behavior, such as a time-series average.

The biometric data can include one or more of: heart rate, blood pressure, step rate, and blood-oxygen content, among other things. The biometric data can also comprise body temperature data measured by an infrared camera or other suitable sensor. The body temperature data can be used to further indicate a stress level of the customer.

In addition, the contents of the review can be analyzed using a natural language device. The natural language device can utilize named entity recognition models (or similar) to determine a level of positivity of the review. The method can also calculate a correlation between the level of positivity and one or more of the measured biometric data properties.

The method can further comprise adding the review data and the indication to a review database associated with the contextualized review system. The review database can also include a plurality of reviews from other customers in the opt-in user database. The reviews in the review database can then be ranked based on their deviation from baseline biometric data. The ranked reviews can then be displayed on a graphical user interface (GUI) and the GUI can be modified to emphasize reviews in which the deviation is greater than a predetermined threshold. The GUI can also be modified to filter out reviews with deviation less than a predetermined threshold.

These and other aspects of the present disclosure are described in the Detailed Description below and the accompanying figures. Other aspects and features of examples of the present disclosure will become apparent to those of ordinary skill in the art upon reviewing the following description of specific, exemplary examples of the present disclosure in concert with the figures. While features of the present disclosure can be discussed relative to certain examples and figures, all examples of the present disclosure can include one or more of the features discussed herein. Further, while one or more examples can be discussed as having certain advantageous features, one or more of such features can also be used with the various examples of the disclosure discussed herein. In similar fashion, while exemplary examples can be discussed below as device, system, or method examples, it is to be understood that such exemplary examples can be implemented in various devices, systems, and methods of the present disclosure.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

Figure 1:
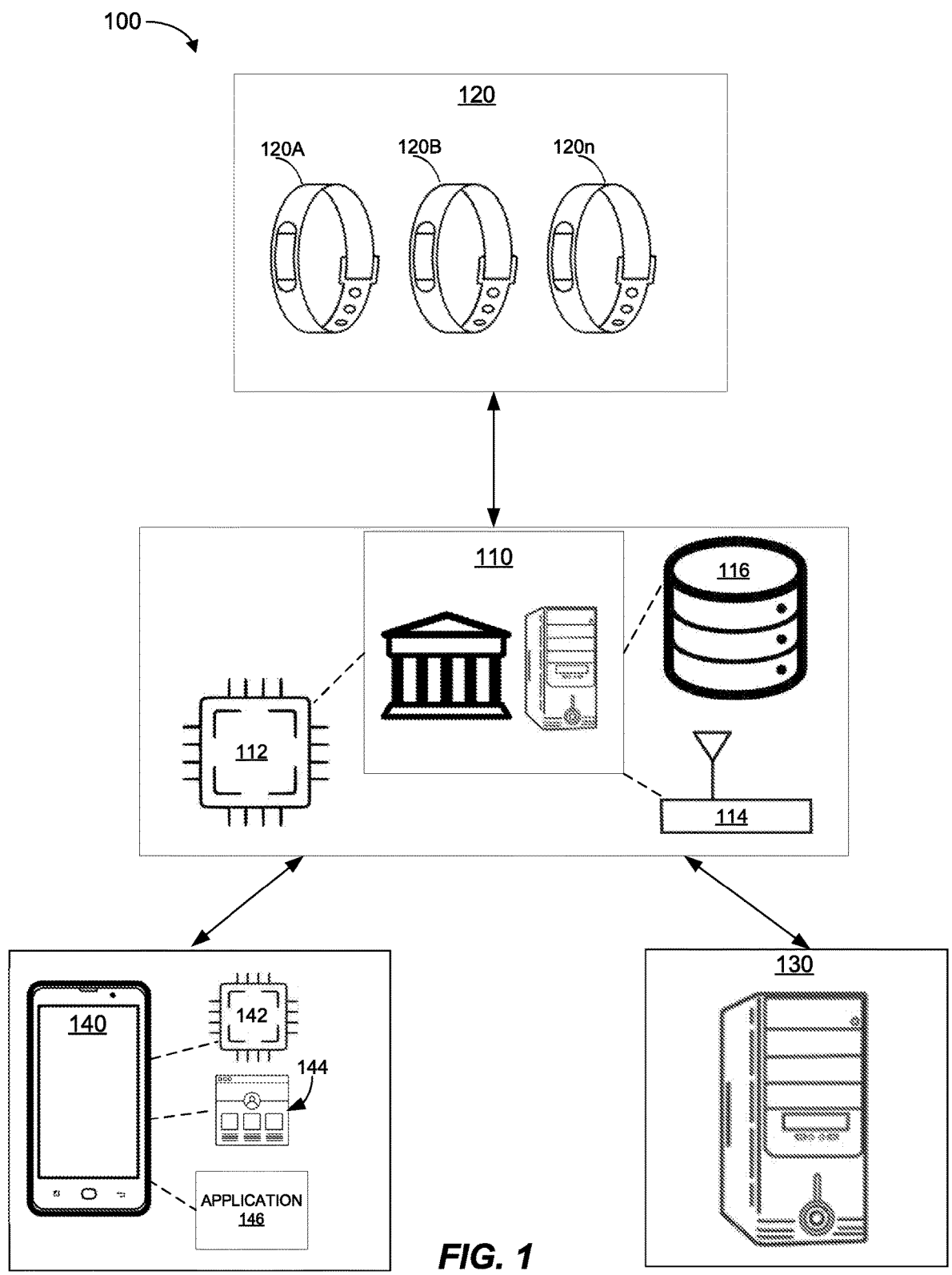
FIG. 1 illustrates a component diagram of an example of a contextualized review system according to some examples of the present disclosure.

Examples of the present disclosure can comprise systems and methods for providing contextualized reviews. When a customer makes a review, for example, the review data can be obtained and analyzed. If it is determined that the customer has opted-in to the system (i.e., to have their reviews contextualized), a biometric measurement device can measure the customer's biometric data at the time of the review. The customer's biometric data can be compared with their historical biometric data to determine if the customer's behavior is deviating from their normal behavior. Upon determining that the customer's biometric data has deviated by an absolute difference from the historical biometric data, the review data from the customer's review can be modified to include a notification. The notification can indicate that the review was written with the customer having biometric data deviating from normal. When the difference indicates that the review may be very negative (e.g., elevated blood pressure and body temperature), the system may also transmit an alert to the customer not to post a review, for example, or to delay the posting.

The systems and methods disclosed herein can also monitor customers that have opted-in to have their reviews contextualized to provide aggregated customer behavior. The aggregated reviews can aid businesses in improving and tailoring their customer experiences. Once the biometric data for all the customers has been obtained and analyzed to modify the review data, the reviews from all the customers can be ranked based on how much each customer's biometric data was deviating from normal. A graphical display can also be used to, for example, emphasize certain reviews having a large biometric deviation from normal, filter out reviews that have biometric data close to normal, or permutations thereof.

Although certain examples of the disclosure are explained in detail, it is to be understood that other examples are contemplated. Accordingly, it is not intended that the disclosure is limited in its scope to the details of construction and arrangement of components set forth in the following description or illustrated in the drawings. Other examples of the disclosure are capable of being practiced or carried out in various ways. Also, in describing the examples, specific terminology will be resorted to for the sake of clarity. It is intended that each term contemplates its broadest meaning as understood by those skilled in the art and includes all technical equivalents which operate in a similar manner to accomplish a similar purpose.

As described above, a problem with current feedback reviews is that consumers tend to share feedback in the heat of the moment and may only feel inclined to share feedback after a somewhat "extreme" experience (good or bad). Because negative reviews and feedback can have an adverse effect on business and products, it is undesirable for reviews to be overly negative. By the same token, overly positive reviews may prevent consumers from making informed decisions about a product or service. With the ongoing proliferation of wearable smart devices, the biometric data is becoming more widely available. The measurement of biometric data can enable additional context and metadata to be added to reviews submitted by customers. By tracking the vital signs of a customer submitting a review, for example, the review data can be modified to include an indicator of the customer's vitals. The modified review data can therefore provide an extra level of context and nuance to customer reviews to enable businesses to better tailor their customer experiences and to provide consumers with more useful reviews.

Reference will now be made in detail to exemplary examples of the disclosed technology, examples of which are illustrated in the accompanying drawings and disclosed herein. Wherever convenient, the same references numbers will be used throughout the drawings to refer to the same, or like, parts.

FIG. 1 illustrates an example of a contextualized review system 100. The components and arrangements shown in FIG. 1 are not intended to limit the disclosed examples as the components used to implement the disclosed processes and features can vary. As shown, the contextualized review system 100 can include an organization 110. The organization 110 can include, or communicate with, one or more processors 112, a memory 114, and one or more storage devices 116. The one or more storage devices 116 can include, for instance, a biometric storage database 116a and a review database 116b. The organization 110 can also include one or more computing devices 130.

In some examples, the organization 110 can be associated with, for example, a business, corporation, individual, partnership, or any entity that can provide financial services or processes financial transactions such as a bank, a credit card company, retailer, or the like. In some examples, the organization 110 can provide goods and services. Although the organization 110 and the one or more computing devices 130 are shown as being separate in FIG. 1, in some examples, some or all of the elements of the organization 110 and the one or more computing devices 130 can be combined together and used in conjunction with each other.

In some examples, the system 100 can also include a plurality of biometric measurement devices 120, including a first biometric device 120A and a second biometric device 120B. Each biometric measurement device 120n can include one or more of a wearable device such as a smart ring, a smart watch, a smart bracelet, smart glasses, smart clothing (e.g., a jacket or shirt having at least some of the electronics discussed herein), or the like. The system 100 can also include a user device 140, which can include one or more of a mobile device, smart phone, general purpose computer, tablet computer, laptop computer, telephone, a public switched telephone network (PSTN) landline, smart wearable device, voice command device, other mobile computing device, or any other device capable of communicating with a network and/or with one or more components of the organization 110. Some or all of the components and/or functionalities of the computing device 130 can be included in the user device 140, and vice-versa. In some examples, the user device 140 and the computing device 130 can refer to the same device. An example of possible user devices 140 and/or computing devices 130 is provided in more detail below with reference to FIG. 5.

In some examples, the biometric storage database 116a within the one or more storage devices 116 can include a plurality of customer biometric profiles, each of which can include biological information such as one or more of images of the customer (e.g., facial and/or body images), height, weight, heartrate data, blood pressure data, step data, step rate data, blood-oxygen content data, hormone level data, body temperature data, eye data (e.g., data for the retina, iris, pupil, etc.), voice data (e.g., tone, pitch, rate of speech, accent, dialect, etc.), respiratory rate data (e.g., breathing rate data), brainwave data, odor/scent data (i.e., olfactory data), and sweat data (e.g., amount produced, rate of production, molecular composition). In certain examples, the user profile can include baseline biometric data representative of the customer's normal behavior or normal state. The baseline biometric data can be obtained by taking a time-series average for one or more criterion of the biological information. The system can then obtain an average value, over time, for the baseline customer biometric data.

The review database 116b within the one or more storage devices 116 can include a plurality of reviews from a plurality of customers registered to participate in the contextualized review system 100. The plurality of users can elect to "opt-in" to the system to have their biometric data measured and their reviews contextualized. The reviews can be aggregated over a period of time for all reviews written by each customer. The reviews can also be stored according to other criteria, such as product being reviewed, business being reviewed, and the like. The review data can comprise review metadata such as, for example, the time and location of the review. The review data can also include the natural language contents of the reviews. In some examples, the contextualized review system 100 can process the natural language of the reviews to determine a level of positivity or negativity of each review. The system 100 can utilize named entity recognition, for example, to detect positive keywords in the reviews and assign a level of positivity based on the number of positive keywords and/or the "strength" of the keywords (e.g., "great" is stronger than "good" and "terrible" is stronger than "mediocre").

Figure 2:
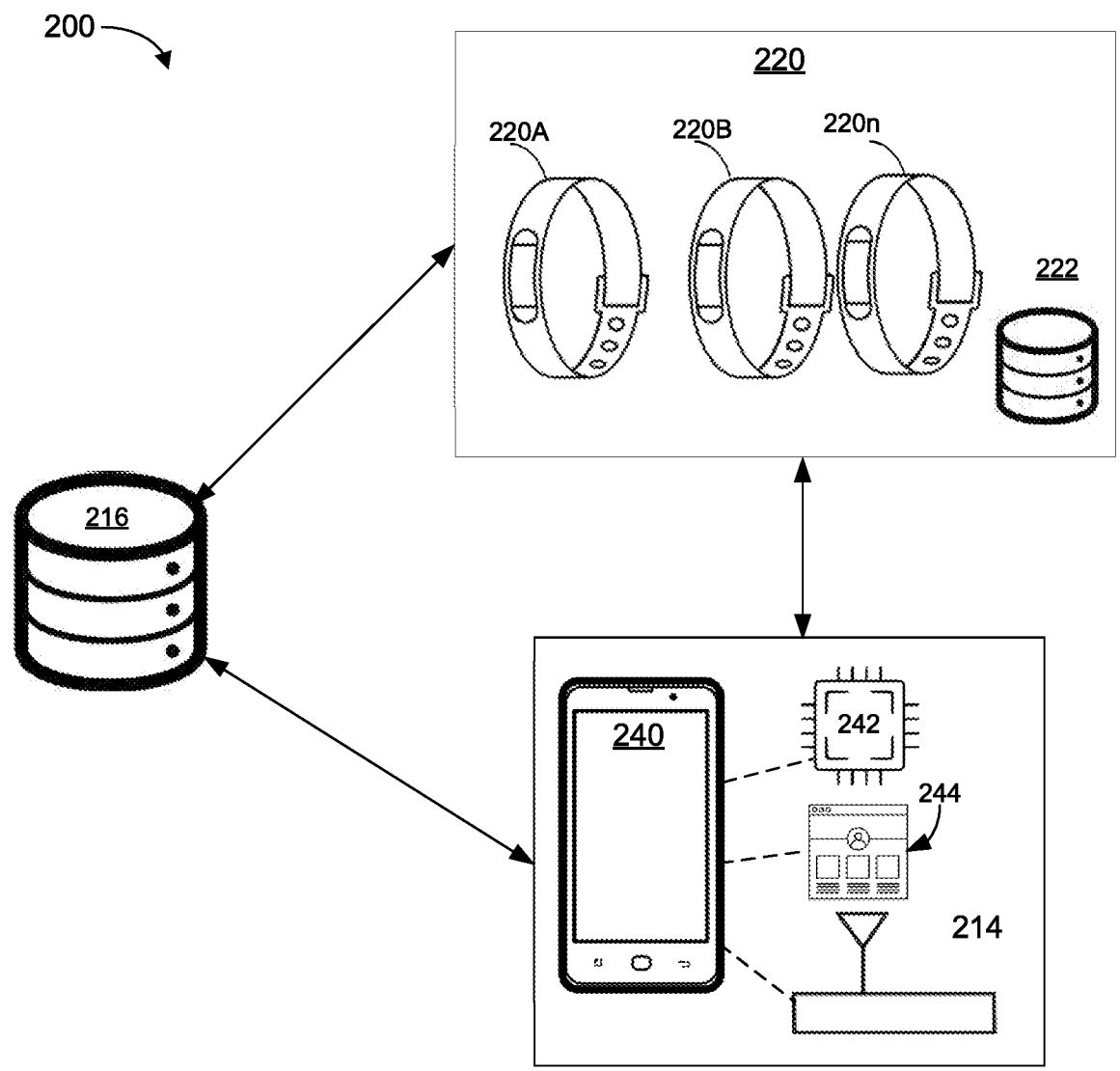
FIG. 2 illustrates a component diagram of another example of a contextualized review system according to some examples of the present disclosure.

FIG. 2 illustrates another example of a contextualized review system 200. The components and arrangements shown in FIG. 2 are not intended to limit the disclosed examples as the components used to implement the disclosed processes and features can vary. As shown, the contextualized review system 200 can include a computing device 240. The computing device 240 can include one or more processors 242, a memory 214, and a graphical user interface (GUI) 244. The computing device 240 can include and/or communicate with one or more storage devices 216. The one or more storage devices 216 can include, for instance, a review database 216a.

In some examples, the system 200 can also include a plurality of biometric measurement devices 220, including a first biometric device 220A and a second biometric device 220B. Each biometric measurement device 220n can include a wearable device, such as a smart ring, a smart watch, a smart bracelet, smart glasses, smart clothing (e.g., a jacket or shirt having at least some of the electronics discussed herein), or the like. The plurality of biometric measurement devices 220 can also include and/or communicate with a biometric storage database 222 to maintain and store historical biometric data. The biometric storage database 222 can be configured to communicate with each biometric measurement device 220n as well as the other components of the contextualized review system 200.

The computing device 240 can include one or more of a mobile device, smart phone, general purpose computer, tablet computer, laptop computer, telephone, a public switched telephone network (PSTN) landline, smart wearable device, voice command device, other mobile computing device, or any other device capable of communicating with a network and/or with one or more components of the contextualized review system 200.

In some examples, the biometric storage database 222 can include a plurality of customer biometric profiles, each of which can include biological information such as one or more of images of the customer (e.g., facial and/or body images), height, weight, heartrate data, blood pressure data, step data, step rate data, blood-oxygen content data, hormone level data, body temperature data, eye data (e.g., data for the retina, iris, pupil, etc.), voice data (e.g., tone, pitch, rate of speech, accent, dialect, etc.), respiratory rate data (e.g., breathing rate data), brainwave data, odor/scent data (i.e., olfactory data), and sweat data (e.g., amount produced, rate of production, molecular composition). In certain examples, the user profile can include baseline biometric data representative of the customer's normal behavior or normal state. The baseline biometric data can be obtained by taking a time-series average for each criterion of the biological information. The system can then obtain an average value, over time, for the baseline customer biometric data.

The review database 216a can include a plurality of reviews from a plurality of customers registered to participate in the contextualized review system 200. The plurality of users can elect to "opt-in" to the system to have their biometric data measured and their reviews contextualized. The reviews can be aggregated over a period of time for all reviews written by the customer. The reviews can also be stored according to other criteria, such as product being reviewed, business being reviewed, and the like. The review data can comprise review metadata, such as, for example, the time and the location of the review. The review data can also include the natural language contents of the reviews. In some examples, the contextualized review system 200 can process the natural language of the reviews to determine a level of positivity or negativity of each. The system 200 can utilize named entity recognition, for example, to detect positive keywords in the reviews and assign a level of positivity based on the number of positive keywords and/or the "strength" of the keywords (e.g., "great" is stronger than "good" and "terrible" is stronger than "mediocre").

Figure 3:
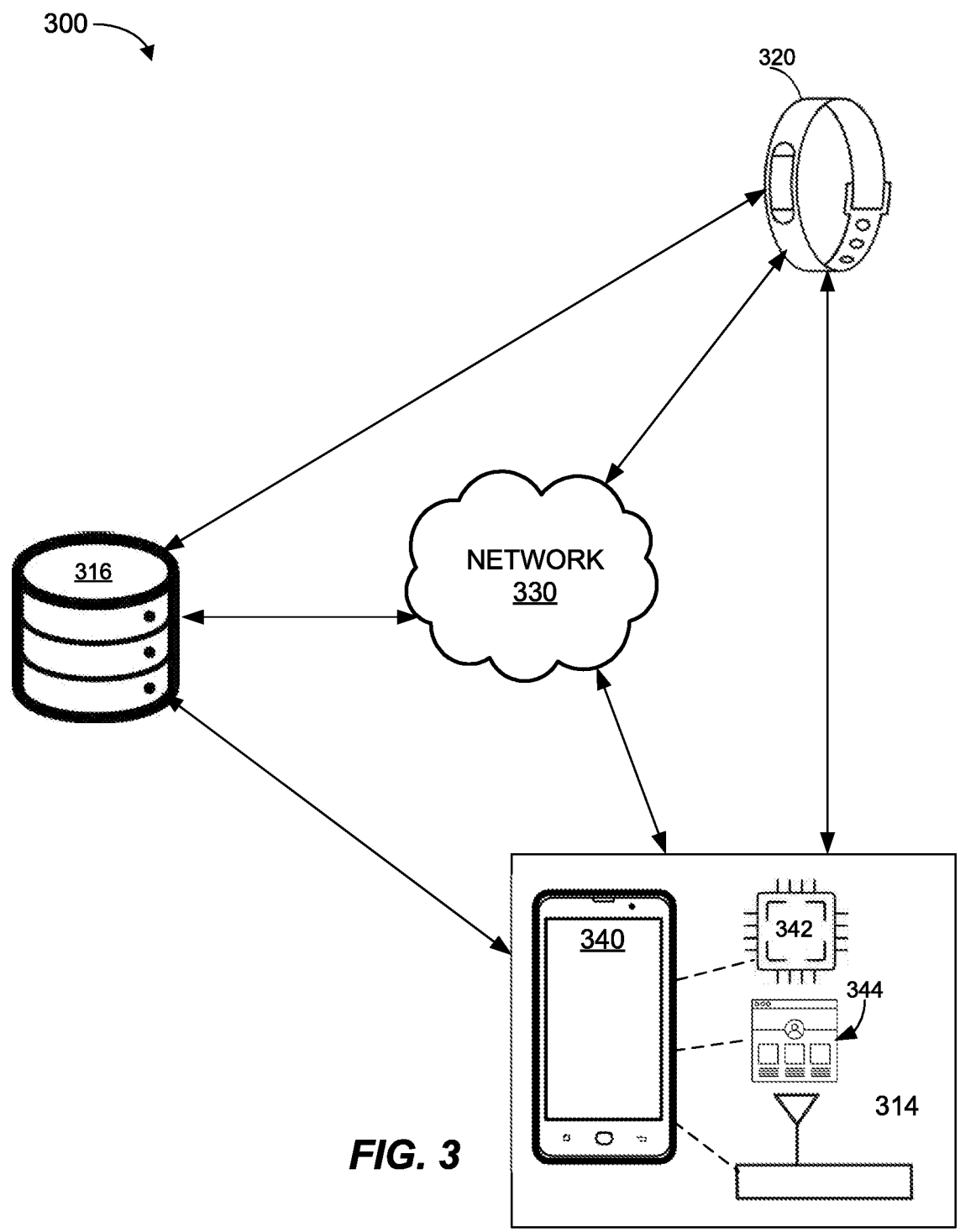
FIG. 3 illustrates a component diagram of another example of a contextualized review system according to some examples of the present disclosure.

FIG. 3 illustrates another example of a contextualized review system 300. The components and arrangements shown in FIG. 3 are not intended to limit the disclosed examples as the components used to implement the disclosed processes and features can vary. As shown, the contextualized review system 300 can include a computing device 340. The computing device 340 can include one or more processors 342, a memory 314, and a graphical user interface (GUI) 344. The computing device 340 can include and/or communicate with one or more storage devices 316. The one or more storage devices 316 can include, for instance, a biometric storage database and/or a review database. The components of the contextualized review system 300 can also be configured to communicate via a network 330.

In some examples, the system 300 can include a biometric measurement device 320. The biometric measurement device 320 can include a wearable device, such as a smart ring, a smart watch, a smart bracelet, smart glasses, smart clothing (e.g., a jacket or shirt having at least some of the electronics discussed herein), or the like. The biometric measurement device 320 can also include and/or communicate with a biometric storage database in the one or more storage devices 316 to maintain and store historical biometric data. The biometric storage database can be configured to communicate with the biometric measurement device 220 as well as the other components of the contextualized review system 300.

The computing device 340 can include one or more of a mobile device, smart phone, general purpose computer, tablet computer, laptop computer, telephone, a public switched telephone network (PSTN) landline, smart wearable device, voice command device, other mobile computing device, or any other device capable of communicating with a network and/or with one or more components of the contextualized review system 300.

In some examples, the biometric storage database within the one or more storage devices 316 can include a customer biometric profile, which can include biological information such as one or more of images of the customer (e.g., facial and/or body images), height, weight, heartrate data, blood pressure data, step data, step rate data, blood-oxygen content data, hormone level data, body temperature data, eye data (e.g., data for the retina, iris, pupil, etc.), voice data (e.g., tone, pitch, rate of speech, accent, dialect, etc.), respiratory rate data (e.g., breathing rate data), brainwave data, odor/scent data (i.e., olfactory data), and sweat data (e.g., amount produced, rate of production, molecular composition). In certain examples, the user profile can include baseline biometric data representative of the customer's normal behavior or normal state. The baseline biometric data can be obtained by taking a time-series average for each criterion of the biological information. The system can then obtain an average value, over time, for the baseline customer biometric data.

The review database within the one or more storage devices 316 can include a plurality of customer reviews from a plurality of customers registered to participate in the contextualized review system 300. The plurality of users can elect to "opt-in" to the system to have their biometric data measured and their reviews contextualized. The reviews can be aggregated over a period of time for all reviews written by the customer. The reviews can also be stored according to other criteria, such as product being reviewed, business being reviewed, and the like. The review data can comprise review metadata, such as, for example, the time and the location of the review. The review data can also include the natural language contents of the plurality of reviews. In some examples, the contextualized review system 300 can process the natural language of the reviews to determine a level of positivity or negativity of each review. The system 300 can utilize named entity recognition, for example, to detect positive keywords in the reviews and assign a level of positivity based on the number of positive keywords and/or the "strength" of the keywords (e.g., "great" is stronger than "good" and "terrible" is stronger than "mediocre").

Figure 4:
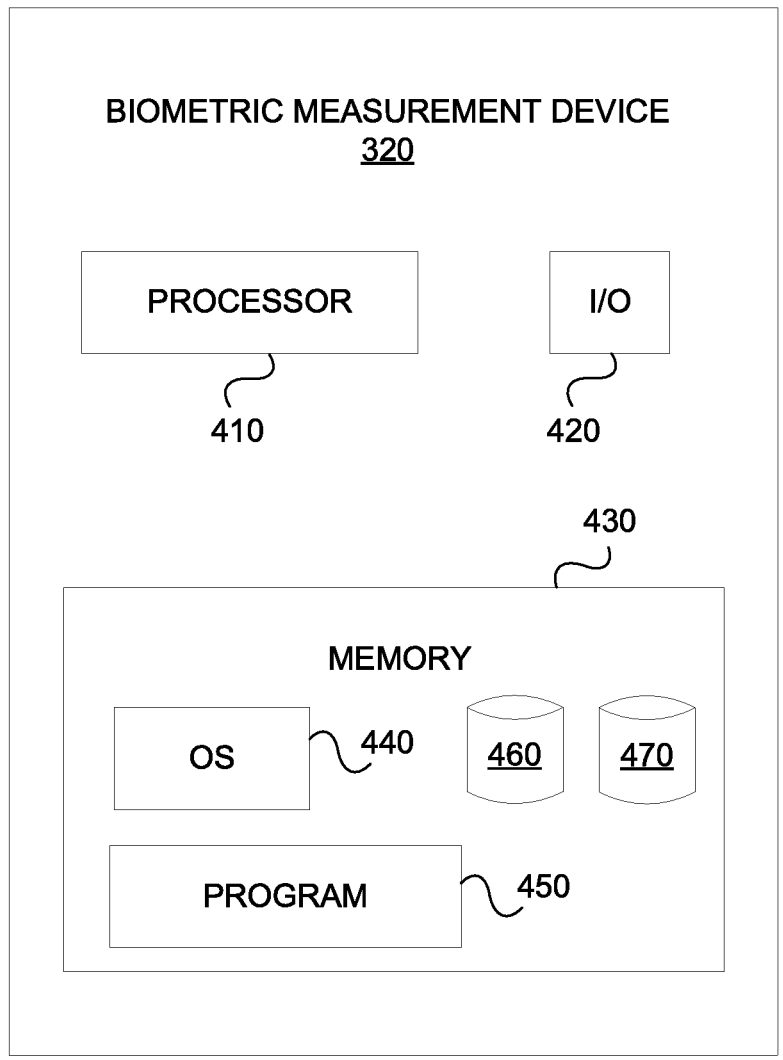
FIG. 4 illustrates a component diagram of an example of a biometric measurement device used in a contextualized review system according to some examples of the present disclosure.

An example of a biometric measurement device is shown in more detail in FIG. 4. While FIG. 4 is illustrated and described with respect to the biometric measurement device 320, it is to be understood that the example of the biometric device 320 is merely illustrative, and that the illustrations within FIG. 4 can correspond to one or more components of the biometric devices 120 and 220.

As shown, the biometric measurement device 320 can include a processor 410; an input/output (I/O) device 420; a memory 430, which can contain an operating system (OS) 440; a storage device 460, which can be any suitable repository of data and can include a historical biometric database; a program 450; and a biometric sensor 470. In some examples, the biometric measurement device can also include a communication interface, such as a transceiver. In some examples, the biometric measurement device can further include a peripheral interface, a mobile network interface in communication with the processor 410, a bus configured to facilitate communication between the various components of the biometric measurement device, and/or a power source configured to power one or more components of the biometric measurement device 320. In certain examples, the biometric measurement device 320 can include a geographic location sensor (GLS) for determining the geographic location of the biometric measurement device.

In some examples, the biometric sensor 470 can be one or more biometric sensors that are configured to detect and/or measure one or more types of biological information. For example, the biometric sensor 470 can be configured to measure one or more of a user's heartrate, blood pressure, hormone levels, body temperature, number of steps, step rate, blood-oxygen content, ocular characteristics (e.g., size, shape, color, and/or other characteristics associated with a user's retina, iris, and/or pupil), voice, respiratory rate (e.g., breathing rate), brainwaves, odor (i.e., olfactory data), and sweat (e.g., amount produced, rate of production, molecular composition). In some examples, the biometric measurement device 320 can include a microphone and/or an image capture device, such as a digital camera or an infrared camera.

The biometric measurement device 320 can obtain body temperature data for a customer utilizing the infrared camera. The body temperature data can be stored and/or averaged to obtain a baseline body temperature for the customer. The system 300 can take a time-series average, for instance, to obtain the baseline data. Then, situational body temperature data can be obtained from the infrared camera and compared to the baseline body temperature data to determine a stress level. The stress level and/or body temperature data can be included in the biometric data. The body temperature analysis from the infrared camera can be performed by a plurality of infrared cameras associated with a plurality of customers.

Figure 5:
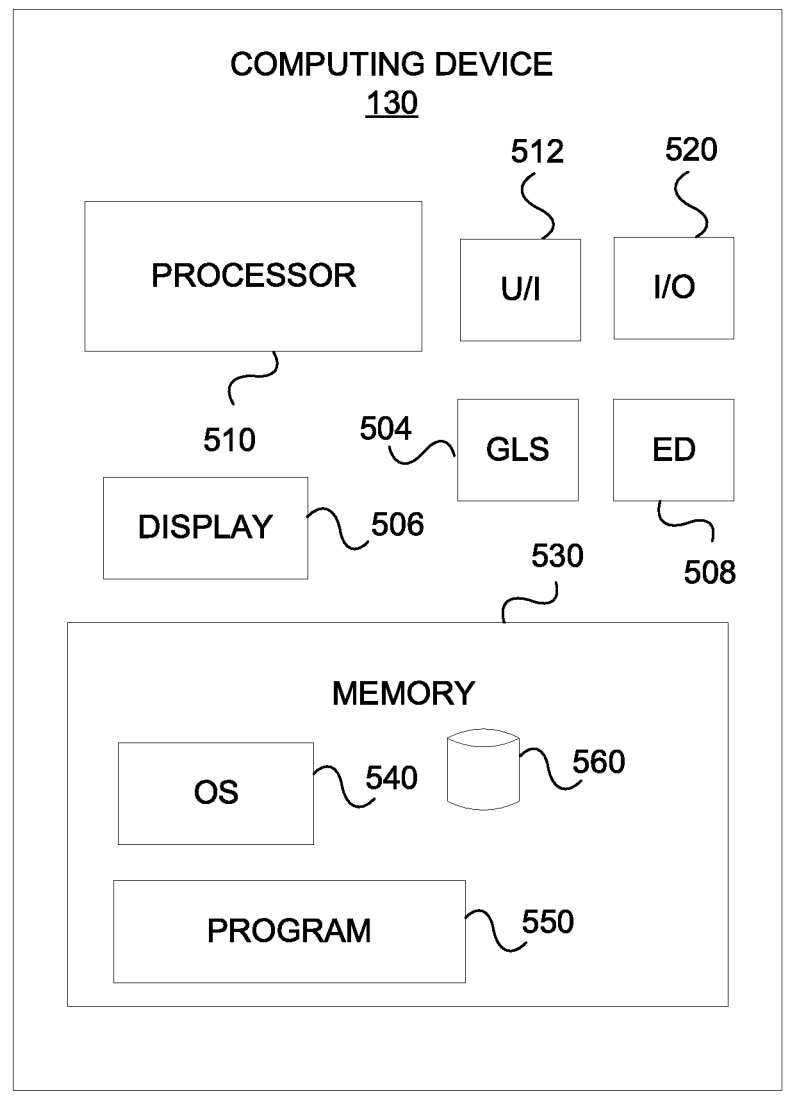
FIG. 5 illustrates a component diagram of an example of a computing device used in a contextualized review system according to some examples of the present disclosure.

An example embodiment of a computing device 130 is shown in more detail in FIG. 5. While FIG. 5 is illustrated and described with respect to the computing device 130, it is to be understood that the example of the biometric device 130 is merely illustrative, and that the illustrations within FIG. 5 can correspond to one or more components of the user device 140, the computing device 240, or the computing device 340.

As shown, the computing device 130 can include a processor 510; an I/O device 520; a memory 530 containing an OS 540; a storage device 560, which can be any suitable repository of data and can include a historical biometric database and/or a review database; and a program 550. In some examples, the computing device 130 can include components such as an accelerometer; a gyroscope; a GLS 504 for determining the geographic location of the computing device 130; a display 506 for displaying content such as text messages, images, and selectable buttons/icons/links; an environmental data ("ED") sensor 508 for obtaining environmental data including audio and/or visual information; a U/I device 512 for receiving user input data, such as data representative of a click, a scroll, a tap, a press, or typing on an input device that can detect tactile inputs; a display; a microphone and/or an image capture device, such as a digital camera. In some examples, the computing device 130 can include a transceiver. In some examples, the computing device 130 can further include a peripheral interface, a mobile network interface in communication with the processor 510, a bus configured to facilitate communication between the various components of the computing device 130, and/or a power source configured to power one or more components of the computing device 130.

The various components of the computing device 130 can include the same or similar attributes or capabilities of the same or similar components discussed with respect to the biometric measurement device 320.

While the following methods may be described with reference to a particular contextualized review system, it is understood that one or more method steps or whole methods can be performed by other contextualized review systems disclosed herein, other systems, general-purpose computers, computer operators, and the like.

Figure 6:
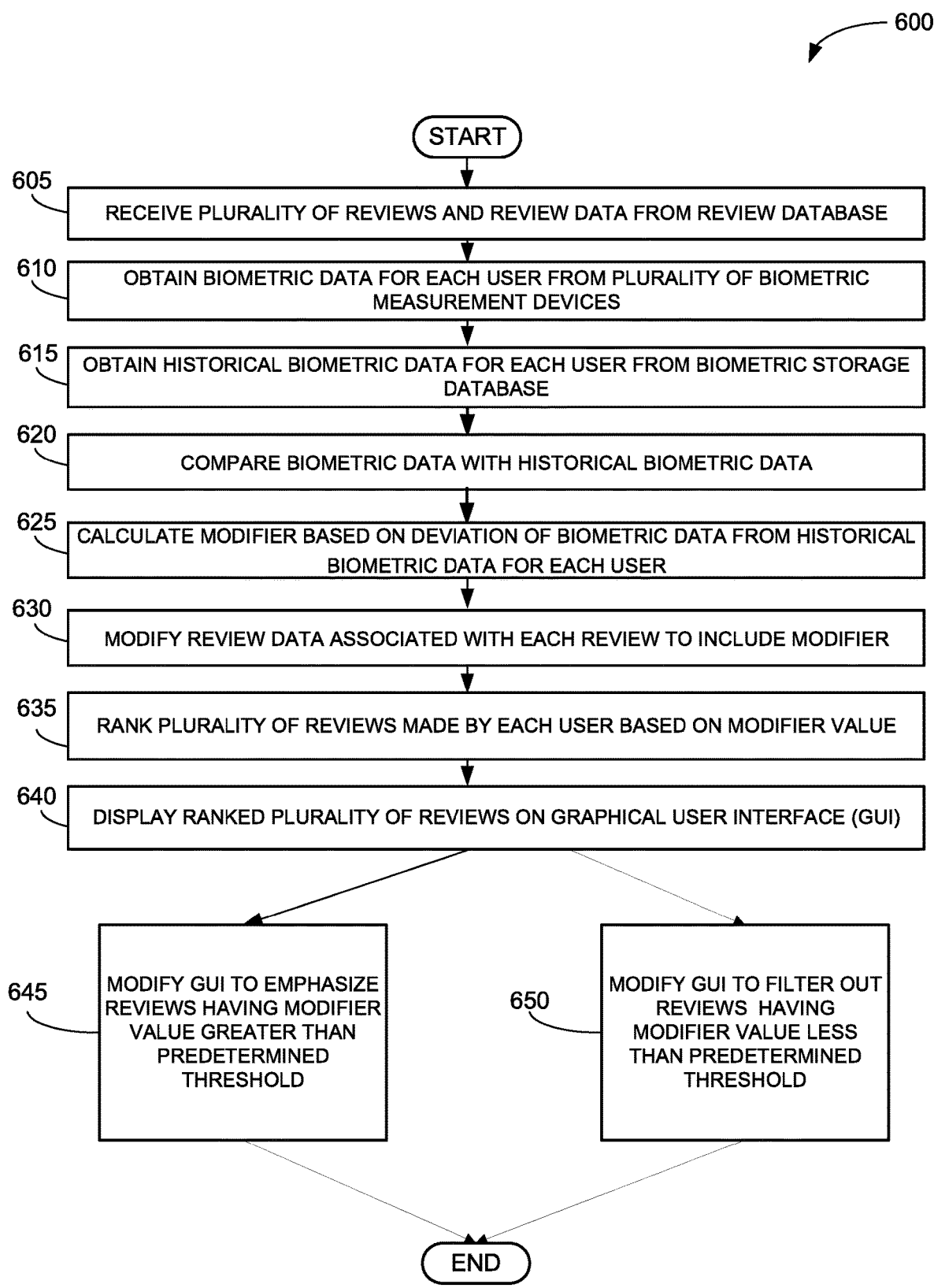
FIG. 6 illustrates a flowchart of an example of a method for providing contextualized reviews according to some examples of the present disclosure.

FIG. 6 illustrates a flowchart of a method for providing contextualized reviews 600 utilizing the contextualized review system 100. It is understood that the contextualized review system 100 can execute the method 600 on any components disclosed therein, such as the memory 114 or the one or more processors 112 and/or 142. As shown in block 605, a plurality of reviews and corresponding review data can be received and/or obtained from the review database 116*b* within the one or more storage devices 116. The review database can be associated with a plurality of users registered to the contextualized review system 100. The review data can be obtained directly by a computing device 130 as part of the organization 110, or by a user device 140 associated with a customer or a user associated with the organization 110. The review data can be retrieved and/or obtained directly from the one or more storage devices 116, or the review data can be transmitted over a network or another form of wireless communication.

At any point prior to being received, or at any point during the method 600, the review data can also be provided to a natural language device for processing. The natural language device can utilize named entity recognition to analyze the plurality of reviews to determine a level of positivity for each review. For example, the natural language device can utilize named entity recognition to recognize positive keywords. The method 600 can then proceed to block 610 or to other method steps not shown.

In block 610, the contextualized review system 100 can obtain biometric data for each of the plurality of users from a biometric measurement device 120*n* associated with each user. For example, a wearable device can measure the heart rate and step rate of the users associated with each of the biometric measurement devices 120. The biometric data can be obtained directly from the plurality of biometric devices 120 and/or the biometric data can be obtained from an application programming interface (API) associated with the biometric devices 120. For instance, a user's wearable biometric measurement device 120A can be associated with an application 146 executed on the user's user device 140. The biometric measurement device 120A can provide the biometric data to the user device 140, where the biometric data can then be obtained by the organization 110. The user can also register their user device 140 to the organization to indicate that they wish to participate in the contextualized review system 100. The method 600 can then proceed to block 615 or to other method steps not shown.

In block 615, the contextualized review system 100 can obtain historical biometric data for each of the plurality of users from a biometric storage database. The biometric storage database 116*a* can be contained within the one or more storage devices 116. The historical biometric data can be measured over time by the plurality of biometric measurement devices 120 for each user. The biometric data can be obtained directly from the plurality of biometric devices 120 and/or the biometric data can be obtained from an application programming interface (API) associated with the biometric devices 120.

At any point prior to being obtained, or at any point during the method 600, the historical biometric data can be analyzed to determine a baseline, or normal, value for each user. For instance, the heart rate data of each user can be averaged over the time series to determine the users' average heart rate. Other methods of calculating a baseline, or normal, value for the biometric data can be used. Additionally, a range of baseline data can be calculated, such as calculating an average with two standard deviations. Other ranges and calculations can be used, such as setting a predetermined threshold. The method 600 can then proceed to block 620 or to other method steps not shown.

In block 620, the biometric data measured by the plurality of biometric measurement devices 120 can be compared with the historical biometric data. In such a manner, the contextualized review system can determine if the users' biometric data are deviating from baseline, or normal, behavior. The comparison can determine, for example, the absolute difference between the value of the measured biometric data and the value of the historical biometric data. The comparison can also include the nominal difference (e.g., include an analysis of higher or lower) to further tune the comparison. Furthermore, the system 100 can correlate the level of positivity for the review data obtained by the natural language device with the biometric data or the comparison of the biometric data with the historical biometric data. For example, if the natural language device found a particular review to have a large number of positive keywords, but the biometric data indicates elevated vitals deviating from normal behavior, the system can correlate that the particular user associated with the particular review may display biometric data outside of the normal range even when the review being made is substantially positive. The method 600 can then proceed to block 625 or to other method steps not shown.

In block 625, the system 100 can calculate a modifier based on the deviation of the biometric data from the historical biometric data. The modifier can be calculated for each user registered to the system 100. The modifier can be directly proportional to the magnitude of deviation away from the historical biometric data. The modifier can also correspond to the absolute difference away from the historical biometric data. The method 600 can then proceed to block 630 or to other method steps not shown.

In block 630, the review data can be modified to include the modifier. This can be done for each user registered to the system 100. The system 100 can modify the review metadata in the review database to include the modifier. The system 100 can also create a new database in the one or more storage devices 116 to store the modifier values for each user along with the modified review data. The modified review data can then be accessed by the organization 110. The method 600 can then proceed to block 635 or to other method steps not shown.

In block 635, the plurality of reviews can be ranked. The plurality of reviews can be ranked based on the review data for each user. For instance, the plurality of reviews can be ranked according to the modifier value. The plurality of reviews can be sorted in ascending order or descending order based on the modifier, or the reviews can be ranked according to the largest modifier values. The ranking can also take into account the calculated level of positivity by the natural language device. The method 600 can then proceed to block 640 or to other method steps not shown.

In block 640, the ranked plurality of reviews can be displayed on a graphical user interface (GUI). The GUI can be displayed on, for example, GUI 144 of the user device. The GUI can also be displayed on the display of the computing device 130, or any device associated with the organization 110. Alternatively, the plurality of reviews can be displayed on the GUI, and the GUI can subsequently be modified to rank the reviews based on the modifier value. Other visual depictions can be used, such as displaying the contents of the review with a color corresponding to the modifier value, or a ranking system similar to a star or heart system can be used to indicate the level of the modifier value. The GUI can also receive inputs from a user to modify the ranking and/or sorting of the reviews. For instance, the user can request the GUI to rank the nonaggressive reviews higher. The GUI can further comprise input fields for receiving input commands from the user, or the GUI can be configured to present selectable options for ranking to the user. The method 600 can then proceed to block 645 or to other method steps not shown. In other examples, the method 600 can then proceed to block 650 or to other method steps not shown.

In block 645, the GUI can be modified to filter out reviews having a modifier value less than a predetermined threshold. This filtering can be modified by the user through the input fields or selectable options. The filtering can comprise simply removing reviews below the threshold, or the filtering can gray out reviews below the threshold. In such a manner, emotional reviews can be emphasized to the users of the contextualized review system 100. In some examples, the method 600 can terminate and complete after block 645. However, in other examples, the method 600 can continue on to other method steps not shown.

In block 650, the GUI can be modified to emphasize reviews having a modifier value greater than a predetermined threshold. The filtering can comprise highlighting, or adding color to, the reviews determined to be above the threshold. The filter can additionally enlarge the reviews or provide some visual indicator such as an exclamation mark or other importance-indicating symbol. In some examples, the method 600 can terminate and complete after block 650. However, in other examples, the method 600 can continue on to other method steps not shown.

Figure 7:
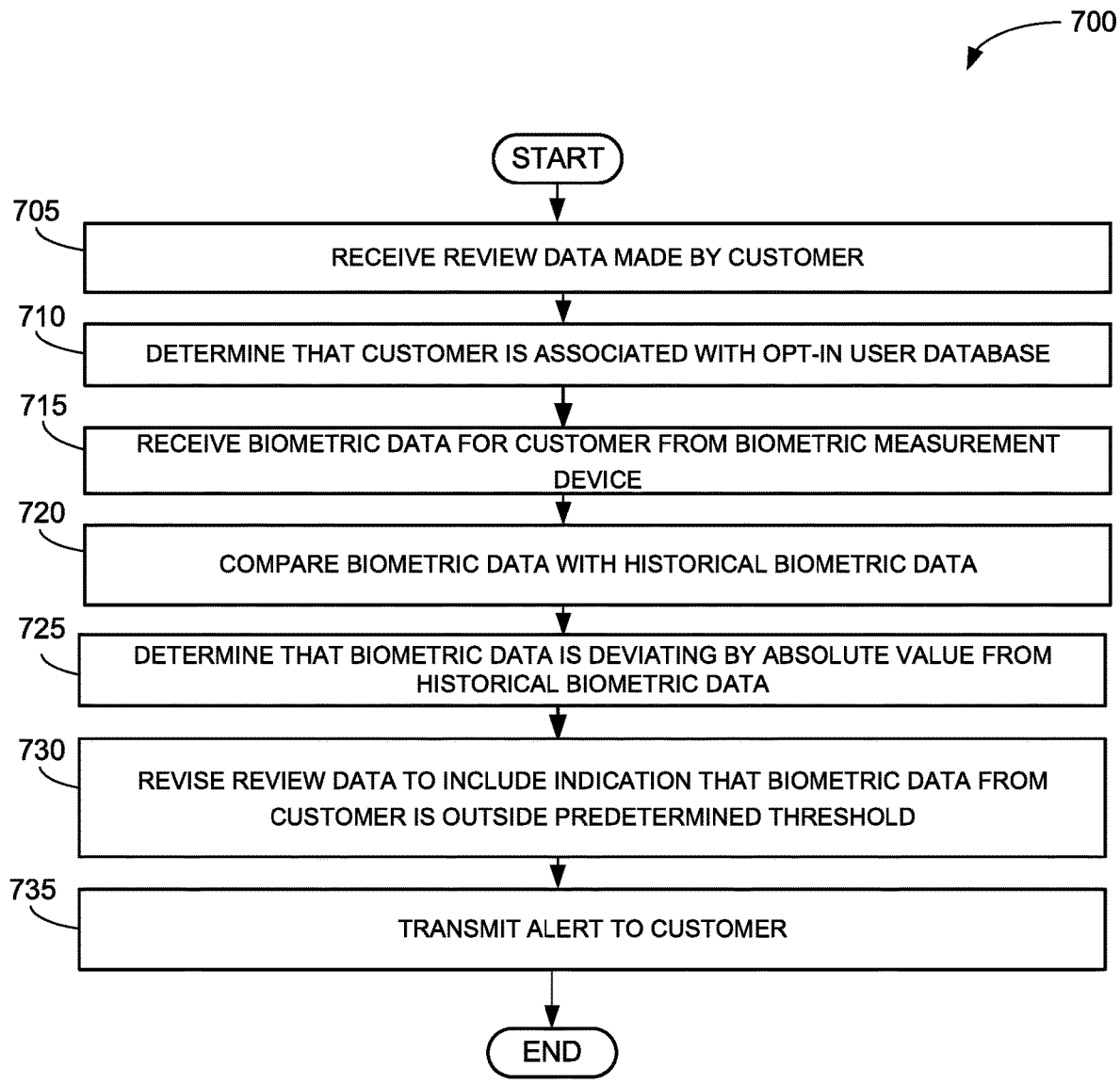
FIG. 7 illustrates a flowchart of another an example of a method for providing contextualized reviews according to some examples of the present disclosure.

FIG. 7 illustrates a flowchart of a method for providing contextualized reviews 700 utilizing the contextualized review system 300. It is understood that the contextualized review system 300 can execute the method 700 on any components disclosed therein, such as the memory 314 or the one or more processors 342. As shown in block 705, a review and corresponding review data can be received and/or obtained from the review database 316. The review and the review data can be associated with a customer and a particular review made by the customer. The review database 316 can be associated with a plurality of users registered to the contextualized review system 300. The review data can be obtained directly by a user device 340 or by another computing device associated with a customer, an organization, or a financial institution. The review data can be retrieved and/or obtained directly from the review database 316, or the review data can be transmitted over a network 330 or another form of wireless communication.

At any point prior to being received, or at any point during the method 700, the review data can also be provided to a natural language device for processing. The natural language device can utilize named entity recognition to analyze the plurality of reviews to determine a level of positivity for each review. For example, the natural language device can utilize named entity recognition to recognize positive keywords. The method 700 can then proceed to block 710 or to other method steps not shown.

In block 710, the system 300 can determine that the customer is associated with an opt-in user database. The opt-in user data base can be associated with the review database 316 and can also be indicative of a plurality of users registered to the contextualized review system 300. The opt-in user database can be an elective system, allowing customers to participate voluntarily in the contextualized review system. The method 700 can then proceed to block 715 or to other method steps not shown.

In block 715, the contextualized review system 300 can obtain biometric data for customer from a biometric measurement device 320 associated with the customer. For example, a wearable device can measure the heart rate and step rate of the customer associated with the biometric measurement device 320. The biometric data can be obtained directly from the biometric measurement device 320 and/or the biometric data can be obtained from an application programming interface (API) associated with the biometric measurement device 320. For instance, the customer's wearable biometric measurement device 320 can be associated with an application executed on the customer's user device 340. The biometric measurement device 320 can provide the biometric data to the user device 340, where the biometric data can then be obtained by an organization, a financial institution, a wearable device provider, other components of the contextualized review system 300, and the like. The customer can also register their user device 340 to indicate that they wish to participate in the contextualized review system 300. The method 700 can then proceed to block 720 or to other method steps not shown.

In block 720, the biometric data can be compared with the historical biometric data. The historical biometric data can be stored a biometric storage database. The biometric storage database can be associated with the biometric measurement device 320. In such a manner, the contextualized review system 300 can determine if the customer's biometric data are deviating from baseline, or normal, behavior. For example, the comparison can determine the absolute difference (e.g., the absolute value of the difference) between the value of the measured biometric data and the value of the historical biometric data. The comparison can also include the nominal difference (e.g., include an analysis of higher or lower, not an absolute value) to further tune the comparison. Furthermore, the system 300 can correlate the level of positivity for the review data obtained by the natural language device with the biometric data or the comparison of the biometric data with the historical biometric data. For example, if the natural language device found the review to have a large number of positive keywords, but the biometric data indicates elevated vitals deviating from normal behavior, the system 300 can correlate that the customer may display biometric data outside of the normal range even when the review being made is substantially positive.

At any point prior to being obtained, or at any point during the method 700, the historical biometric data can be analyzed to determine a baseline, or normal, value for each user. For instance, the heart rate data of the customer can be averaged over the time series to determine the customer's average heart rate. Other methods of calculating a baseline, or normal, value for the biometric data can be used. Additionally, a range of baseline data can be calculated, such as calculating an average with two standard deviations. Other ranges and calculations can be used, such as setting a predetermined threshold. The method 800 can then proceed to block 725 or to other method steps not shown.

In block 725, the system 300 can determine that the biometric data has deviated from the historical biometric data. The system 300 can determine this by calculating the deviation of the biometric data from the historical biometric data. The deviation can be directly proportional to the absolute difference away from the historical biometric data. The determining can also include determining if the deviation away from the historical biometric data is greater than or less than a predetermined threshold. The method 700 can then proceed to block 730 or to other method steps not shown.

In block 730, the review data can be revised to include an indication that the biometric data has deviated from the historical biometric data. The system 300 can modify the review metadata in the review database 316 to include the indication. The system 300 can also create a new database to store the modifier values for each user along with the modified review data. The method 700 can then proceed to block 735 or to other method steps not shown.

In block 735, an alert can be transmitted to the customer warning the customer that their biometric data has deviated outside the predetermined threshold. The warning can also include a note to the customer to not post the review, or to revise and/or remove the review. The warning can alternatively or additionally be a confirmation to the customer to confirm if they indeed would like to post the review. In some examples, the method 700 can terminate and complete after block 735. However, in other examples, the method 700 can continue on to other method steps not shown.

The method 700 disclosed in FIG. 7 can additionally be repeated for a plurality of customers also registered to the contextualized review system 300. The plurality of customers can be associated with an organization, such as an owner of the contextualized review system 300. The plurality of reviews can be ranked based on the review data for each customer. For instance, the plurality of reviews can be ranked according to the deviation from the historical biometric data. The plurality of reviews can be sorted in ascending order or descending order based on the deviation, or the reviews can be ranked according to the largest deviation values. The ranking can also take into account the calculated level of positivity by the natural language device.

The ranked plurality of reviews can further be displayed on a graphical user interface (GUI). The plurality of reviews can be displayed on a GUI, and the GUI can subsequently be modified to rank the reviews based on the deviation value. Other visual depictions can be used, such as displaying the contents of the review with a color corresponding to the modifier value, or a ranking system similar to a star or heart system can be used to indicate the level of the modifier value. The GUI can also receive inputs from a user to modify the ranking and/or sorting of the reviews. For instance, the user can request the GUI to rank the nonaggressive reviews higher. The GUI can further comprise input fields for receiving input commands from the user, or the GUI can be configured to present selectable options for ranking to the user. The input fields can be adjusted and altered by a user associated with an organization or with an owner of the contextualized review system 300.

Figure 8:
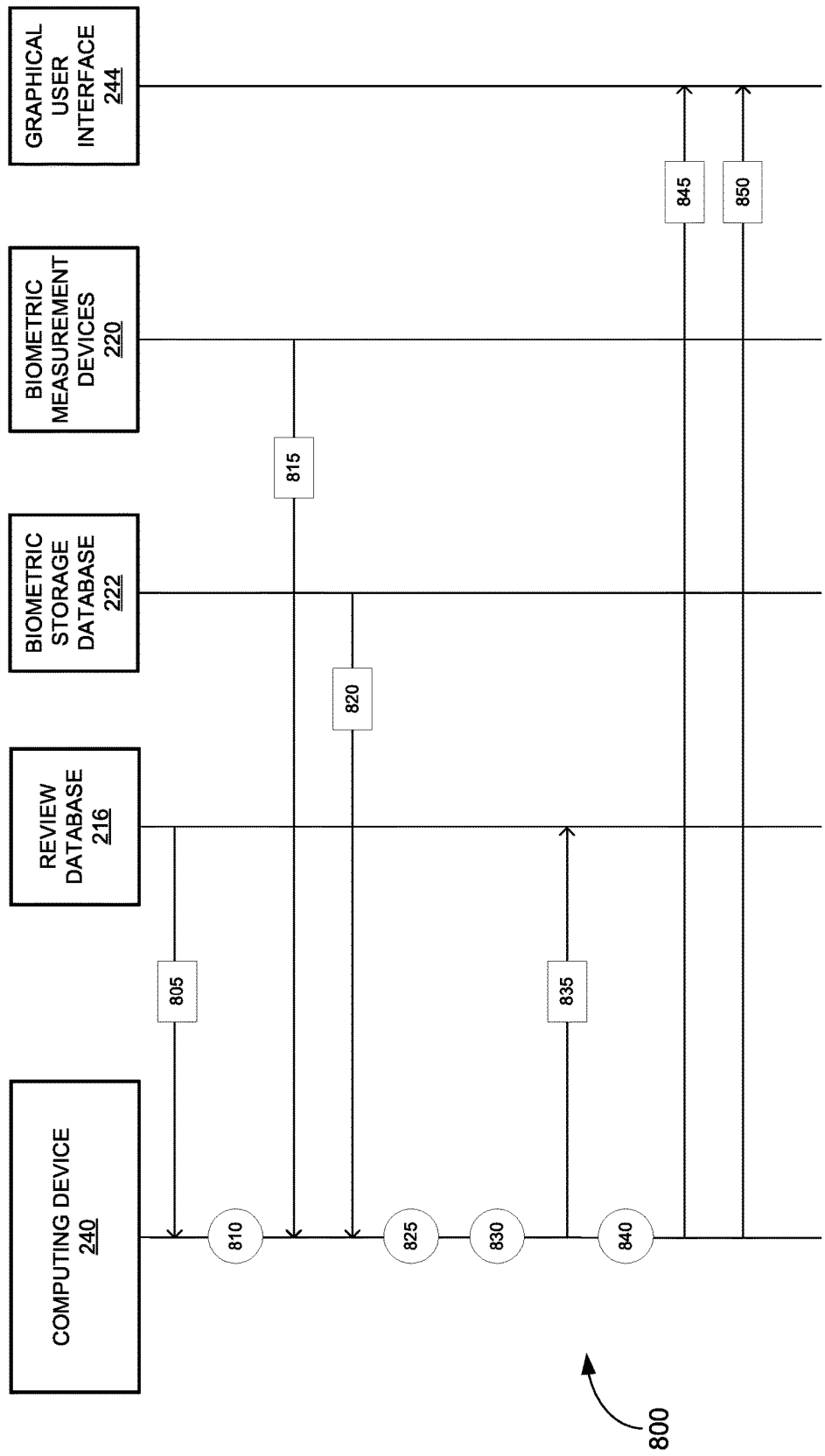
FIG. 8 illustrates a timing diagram for an example of a system for providing contextualized reviews according to some examples of the present disclosure.

FIG. 8 illustrates a timing diagram 800 for providing contextualized reviews. While the following timing diagram may be described with reference to a particular contextualized review system 100, it is understood that one or more steps can be performed by other contextualized review systems disclosed herein, other systems, general-purpose computers, computer operators, and the like.

As shown, in block 805, review data can be transferred from the review database 216*a* to the computing device 240. A plurality of reviews and corresponding review data can be received and/or obtained from the review database 216*a*. The review database 216*a* can be associated with a plurality of users registered to the contextualized review system 200. The review data can be retrieved and/or obtained directly from the review database 216*a*, or the review data can be transmitted over a network or another form of wireless communication.

At any point prior to being received the review data can also be provided to a natural language device for processing. The natural language device can utilize named entity recognition to analyze the plurality of reviews to determine a level of positivity for each review. For example, the natural language device can utilize named entity recognition to recognize positive keywords.

In block 810, the computing device 240 can determine that a subset of users associated with an opt-in user database. The opt-in user data base can be associated with the review database 216*a* and can also be indicative of a plurality of users registered to a contextualized review system. The opt-in user database can be an elective system, allowing customers to participate voluntarily in the contextualized review system.

In block 815, the computing device 240 can obtain biometric data for each of the plurality of users from a plurality of biometric measurement devices 220 associated with each user. For example, a wearable device can measure the heart rate and step rate of the users associated with each of the biometric measurement devices 220. The biometric data can be obtained directly from the plurality of biometric measurement devices 220 and/or the biometric data can be obtained from an application programming interface (API) associated with the biometric measurement devices 220, such as a wearable device. For instance, a user's wearable biometric measurement device can be associated with an application executed on the user's mobile device. The biometric measurement device can provide the biometric data to the mobile device, where the biometric data can then be obtained the computing device 240.

In block 820, the computing device 240 can obtain historical biometric data for each of the plurality of users from a biometric storage database 222. The historical biometric data can be obtained directly from the plurality of biometric storage database 222 and/or the biometric data can be obtained from an application programming interface (API) associated with the biometric measurement devices 220, such as a wearable device.

In block 825, the biometric data measured by the plurality of biometric measurement devices 220 can be compared with the historical biometric data. The historical biometric data can be stored in biometric storage database 222. The biometric storage database 222 can be associated with the plurality of biometric measurement devices 220. In such a manner, the computing device 240 can determine if the users' biometric data are deviating from baseline, or normal, behavior. The comparison can determine, for example, the absolute difference between the value of the measured biometric data and the value of the historical biometric data. The comparison can also include the nominal difference (e.g., include an analysis of higher or lower) to further tune the comparison.

At any point prior to being obtained, the historical biometric data can be analyzed to determine a baseline, or normal, value for each user. For instance, the heart rate data of each user can be averaged over the time series to determine the users' average heart rate. Other methods of calculating a baseline, or normal, value for the biometric data can be used. Additionally, a range of baseline data can be calculated, such as calculating an average with two standard deviations. Other ranges and calculations can be used, such as setting a predetermined threshold. The baseline data can be maintained in the biometric storage database 222 and associated with each user. The baseline data can then be provided to the computing device 240 along with the historical biometric data.

In block 830, the computing device 240 can calculate a modifier based on the deviation of the biometric data from the historical biometric data. The modifier can be calculated for each user registered to the opt-in user database. The modifier can be directly proportional to the magnitude of deviation away from the historical biometric data. The modifier can also correspond to the absolute difference away from the historical biometric data.

In block 935, the review data in the review database 216a can be modified to include the modifier. This can be done for each user registered to the review database 216a. The computing device 240 can modify the review metadata in the review database 216a to include the modifier or create a new modified database for storing the review data.

In block 840, the plurality of reviews can be ranked. The plurality of reviews can be ranked based on the review data for each user. For instance, the plurality of reviews can be ranked according to the modifier value. The plurality of reviews can be sorted in ascending order or descending order based on the modifier, or the reviews can be ranked according to the largest modifier values.

In block 845, the ranked plurality of reviews can be displayed on a graphical user interface (GUI) 244. Alternatively, the plurality of reviews can be displayed on the GUI 244, and the GUI 244 can subsequently be modified to rank the reviews based on the modifier value. Other visual depictions can be used, such as displaying the contents of the review with a color corresponding to the modifier value, or a ranking system similar to a star or heart system can be used to indicate the level of the modifier value. The GUI 244 can also receive inputs from a user to modify the ranking and/or sorting of the reviews. For instance, the user can request the GUI 244 to rank the nonaggressive reviews higher. The GUI 244 can further comprise input fields for receiving input commands from the user, or the GUI 244 can be configured to present selectable options for ranking to the user.

In block 850, the GUI 244 can be modified. The GUI 244 can be modified to emphasize reviews having a modifier value greater than a predetermined threshold. This filtering can be modified by the user through the input fields or selectable options. The filtering can comprise highlighting, or adding color to, the reviews determined to be above the threshold. The filter can additionally enlarge the reviews or provide some visual indicator such as an exclamation mark or other importance-indicating symbol. The filtering can alternatively or additionally comprise simply removing reviews below the threshold, or the filtering can gray out reviews below the threshold. In such a manner, emotional reviews can be emphasized to the users of the contextualized review system.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

EXEMPLARY USE CASES

The following exemplary use cases describe examples of a typical user flow pattern. They are intended solely for explanatory purposes and not limitation.

A merchant, such as a Starbucks store, can use a contextualized review system to improve the usefulness of customer reviews. The Starbucks store may be testing a new beverage on a particular day, for example, and Jim can submit an online review of the beverage. The contents of the review can be stored in a review database along with review metadata, such as time and location data. The contextualized review system can then determine if Jim has voluntarily elected to participate in the contextualized review system.

If so, the system can measure biometric data from Jim utilizing a biometric measurement device (e.g., an Apple watch). The Apple watch can measure Jim's heart rate, step rate, and blood-oxygen content, among other things. The system can then compare the measured heart rate, for example, with historical heart rate data stored for Jim (e.g., from the biometric storage database 222 to determine if the measured heart rate data is different than the historical heart rate data (i.e., the heart rate found to be "normal" for Jim).

If Jim is found to have a significantly high heart rate (i.e., deviating from the historical heart rate data by more than a predetermined value), for example, the system can revise the review data to include this information. The system can add a note to Jim's review, for example, indicating that Jim had an elevated heart rate at the time he submitted the review. The system can store this information along with the review data for the Starbucks store. The system can also transmit an alert to Jim through Jim's mobile device or Apple watch with this information. The alert can also include a warning that Jim may not want to post the review until he has calmed down or ask for a confirmation that Jim would like to post the review despite his elevated heart rate.

The system can continually contextualize reviews of customers who opt-in to the system and visiting the Starbucks store. The Starbucks store can then further analyze the review database. The reviews can be displayed on a graphical user interface (GUI), for example, that highlights the reviews with abnormal biometric data. The Starbucks store may be able to determine, for example, that a large portion of highlighted reviews are actually positive reviews with elevated heart rates. From this, the Starbuck's store can determine that the elevated heart rates associated with the reviews is because the reviewers really like the new beverage, not because they had a bad experience. In addition, other consumers looking at the reviews may attach more or less significance to these reviews based on the abnormal biometric data.

What is claimed is:

1. A method for providing contextualized customer reviews, the method comprising:
   receiving review data from a review made by a customer;
   analyzing, using a natural language device, the review to determine a level of positivity for the review;

determining that the customer is included in an opt-in user database, the opt-in user database comprising a plurality of users registered to participate in a contextualized review system;

receiving, from a biometric measurement device, biometric data for the customer, the biometric data comprising at least respiratory rate data;

retrieving, from a biometric database, a biometric profile including historical biometric data for the customer indicative of a baseline biometric state;

comparing the biometric data with the historical biometric data measured over time by calculating a modifier based on a deviation of the biometric data from the historical biometric data;

calculating a correlation between the level of positivity and the historical biometric data measured over time;

calculating a modifier based on the biometric data for the customer, the modifier calculated based on an absolute value between the biometric data and the historical biometric data;

determining that the modifier exceeds a predetermined value;

transmitting a first alert to the customer comprising a confirmation that the customer is making the review;

responsive to receiving the confirmation from the customer, updating the review data to include an indication that the biometric data from the customer is outside the predetermined value;

updating the correlation between the level of positivity and the historical biometric data measured over time to include the modifier, the update to the historical biometric data further comprising a time-series average of the baseline biometric state the biometric data giving rise to the modifier;

updating the biometric profile associated with the customer;

amending the review data to include the modifier; and transmitting a second alert to the customer that the biometric data is outside the predetermined value.

2. The method of claim 1, further comprising:

adding the review data and the indication to a review database in the contextualized review system, the review database comprising a plurality of reviews from the plurality of users registered to participate in the contextualized review system; and ranking the plurality of reviews in the review databased based on the indication and review data for each review from the plurality of users, wherein the ranking is directly proportional to the absolute value of each review.

3. The method of claim 2, further comprising:

displaying, on a graphical user interface (GUI), the ranked plurality of reviews; and updating the GUI to emphasize reviews having an absolute value greater than a predetermined threshold.

4. The method of claim 1, wherein:

the biometric data further comprises a heart rate, a blood pressure, a step rate, a blood-oxygen content, facial images, body images, height, weight, hormone level data, body temperature data, eye data, voice data, brainwave data, scent data, and sweat data, eye data comprises data regarding a retina, an iris, and a pupil of the customer, voice data comprises a tone, pitch, rate of speech, accent, and a dialect of the customer, and sweat data comprises an amount produced, a rate of production, and a molecular composition.

5. The method of claim 1, wherein receiving biometric data for the customer comprises receiving, from an infrared camera, body temperature data for the customer; and wherein determining the absolute value comprises:

analyzing the body temperature data to determine a body temperature of the customer;

comparing the body temperature of the customer to historic body temperatures for the customer as an indication of a stress level for the customer; and modifying the review data to include the stress level of the customer.

6. The method of claim 1, wherein:

the historical biometric data comprises a time-series average biometric baseline for the customer, and the biometric measurement device is a wearable smart device.

7. A method for providing contextualized customer reviews, the method comprising:

obtaining, from a biometric measurement device associated with each customer of a plurality of customers, biometric data for each customer;

receiving a plurality of reviews comprising review data and biometric data for each customer, the biometric data associated with a time during which each customer made a review;

comparing the biometric data with historical biometric data measured over time for each customer, the historical biometric data being obtained from a biometric profile for the customer indicative of a baseline biometric state;

calculating a modifier based on a deviation of the biometric data from the historical biometric data for each customer;

analyzing, using a natural language device using named entity recognition, the plurality of reviews to determine a level of positivity for each review;

calculating a correlation between the level of positivity and the modifier value;

determining, for a first set of customers, that the modifier is greater than a first predetermined threshold;

transmitting an alert to each of the first set of customers, the alert comprising a confirmation of a review associated with each of the first set of customers;

responsive to receiving the confirmation of the review, modifying the review data associated with each of the first set of customers to include the confirmation;

modifying the review data associated with each review to include the modifier;

ranking the plurality of reviews made by each customer based on the modifier value and the level of positivity;

displaying, on a graphical user interface (GUI), the ranked plurality of reviews and input fields configured to receive input commands from the user;

receiving, from the GUI, a modification to the ranked plurality of reviews input by the user on the GUI, the modification comprising a request to view reviews having the modifier be greater than the first predetermined threshold;

modifying the GUI to emphasize reviews from the first set of customers having the modifier greater than the first predetermined threshold; and modifying the GUI to filter out reviews having a modifier below the first predetermined threshold.

8. The method of claim 7, wherein the biometric data comprises a heart rate, a blood pressure, a step rate, a blood-oxygen content, facial images, body images, height, weight, hormone level data, body temperature data, eye data, voice data, respiratory rate data, brainwave data, scent data, and sweat data.

9. The method of claim 7, wherein obtaining biometric data further comprises:
  receiving, from an infrared camera, body temperature data for each customer; and
  wherein calculating the modifier comprises:
    analyzing the body temperature data to determine a body temperature of each customer;
    comparing the body temperature of each customer to historic body temperatures for each customer to determine a stress level; and
    modifying the review data associated with each review to include the stress level of each customer.

10. The method of claim 7, wherein the historical biometric data comprises a time-series average biometric baseline for each customer.

11. A contextualized review system, comprising:
  a graphical user interface (GUI);
  a review database, comprising a plurality of reviews and a plurality of users registered to participate the contextualized review system;
  a plurality of biometric measurement devices associated with each of the plurality of users;
  a biometric storage database;
  one or more processors; and
  a memory storing instructions that, when executed by the one or more processors, cause the contextualized review system to:
    receive, from the review database, the plurality of reviews and review data from the plurality of users;
    obtain, from the plurality of biometric measurement devices, biometric data for each user, the biometric data comprising at least body temperature data, wherein the body temperature data indicates a stress level of each user;
    obtain, from the biometric storage database, historical biometric data for each user, the historical biometric data being measured over time by each biometric measurement device associated with each user, the historical biometric data being obtained from a biometric profile for the customer indicative of a baseline biometric state;
    compare the biometric data with the historical biometric data;
    calculate a modifier based on a deviation of the biometric data from the historical biometric data, the modifier comprising an absolute difference between the biometric data and the historical biometric data;
    analyze, using a natural language device, the plurality of reviews to determine a level of positivity for each review;
    calculate a correlation between the level of positivity and the modifier value;
    determine, for a first set of customers, that the modifier is greater than a first predetermined threshold;
    transmit an alert to each of the first set of customers, the alert comprising a confirmation of a review associated with each of the first set of customers;
    responsive to receiving the confirmation of the review, modify the review data associated with each of the first set of customers to include the confirmation;
    modify, in the review database, the review data associated with each review to include the modifier, the level of positivity, and the stress level for each user;
    update the correlation between the level of positivity and the historical biometric data measured over time to include the modifier, the update to the historical biometric data further comprising a time-series average of the baseline biometric state the biometric data giving rise to the modifier;
    updating the biometric profile associated with the customer;
    rank the plurality of reviews made by each user based on the modifier value and the level of positivity, wherein the ranking is directly proportional to the modifier value and the correlation;
    display, on the GUI, the ranked plurality of reviews and input fields configured to receive input commands from the user;
    receive, from the GUI, a modification to the ranked plurality of reviews input by the user on the GUI, the modification comprising a request to view reviews having the modifier be greater than the first predetermined threshold; and
    modify the GUI to filter out (i) reviews having a modifier value less than the first predetermined threshold and (ii) reviews that have a level of positivity and a modifier outside of the correlation.

12. The contextualized review system of claim 11, wherein:
  the biometric data further comprises a heart rate, a blood pressure, a blood-oxygen content, step data, eye data, voice data, and sweat data,
  step data comprises a step rate,
  eye data comprises data regarding a retina, an iris, and a pupil of the customer,
  voice data comprises a tone, pitch, rate of speech, accent, and a dialect of the customer, and
  sweat data comprises an amount produced, a rate of production, and a molecular composition.

13. The contextualized review system of claim 11, further comprising a plurality of infrared cameras associated with each of the plurality of users, each infrared camera configured to obtain the body temperature data for each user.

14. The contextualized review system of claim 13, wherein the instructions further cause the contextualized review system to:
  analyze the body temperature data to determine a body temperature of each user; and
  compare the body temperature of each user to historic body temperatures from the biometric storage database for each customer to determine a stress level.

15. The contextualized review system of claim 11, wherein:
  the historical biometric data comprises a time-series average biometric baseline for each user; and
  the plurality of biometric measurement devices are wearable smart devices.

16. The method of claim 1, wherein the level of positivity is based on a number of positive keywords used in the review and a strength of the positive keywords used in the review.

17. The method of claim 7, wherein each biometric measurement device comprises a wearable biometric device associated with and worn by the plurality of customers.

18. The contextualized review system of claim 11, wherein the level of positivity is based on a number of positive keywords used in the review and a strength of the positive keywords used in the review.

19. The method of claim 5, wherein receiving biometric data for the customer further comprises receiving, from a visual camera, facial and body image data for the customer; and wherein determining the absolute value further comprises:
comparing the facial and body image data of the customer to the biometric profile stored in the historical biometric data for the customer; and
modifying the biometric profile to include the stress level in the review data with a correlation to the facial and body image data of the customer.

20. The method of claim 9, wherein obtaining biometric data further comprises:
receiving, from a visual camera, facial and body image data for the customer; and
wherein calculating the modifier comprises:
comparing the facial and body image data of the customer to the biometric profile stored in the historical biometric data for the customer; and
modifying the biometric profile to include the stress level in the review data with a correlation to the facial and body image data of the customer.

\* \* \* \* \*